United States Patent
Cole et al.

(10) Patent No.: US 12,005,792 B2
(45) Date of Patent: Jun. 11, 2024

(54) CHARGE DETECTION FOR AUTOMATIC CHARGING SYSTEMS

(71) Applicant: ABB E-Mobility B.V., Delft (NL)

(72) Inventors: Gregory Cole, Plainville, CT (US); Ali Ugur, The Hague (NL); Will Eakins, Coventry, CT (US)

(73) Assignee: ABB E-MOBILITY B.V., Delft (NL)

( * ) Notice: Subject to any disclaimer, the term of this patent is extended or adjusted under 35 U.S.C. 154(b) by 211 days.

(21) Appl. No.: 17/385,786

(22) Filed: Jul. 26, 2021

(65) Prior Publication Data
US 2023/0026784 A1    Jan. 26, 2023

(51) Int. Cl.
*B60L 53/16*    (2019.01)
*B60L 53/30*    (2019.01)
*B60L 53/35*    (2019.01)

(52) U.S. Cl.
CPC .............. *B60L 53/16* (2019.02); *B60L 53/305* (2019.02); *B60L 53/35* (2019.02)

(58) Field of Classification Search
CPC ........ B60L 53/16; B60L 53/305; B60L 53/35; B60L 53/66; B60L 58/12; B60L 53/14; Y02T 10/70; Y02T 10/7072; Y02T 90/14; Y02T 90/16

USPC .......................................................... 320/109
See application file for complete search history.

(56) References Cited

U.S. PATENT DOCUMENTS

| | | | | |
|---|---|---|---|---|
| 5,306,999 | A * | 4/1994 | Hoffman | B60L 53/16 320/109 |
| 2012/0048983 | A1* | 3/2012 | Bianco | G07F 15/005 242/388.9 |
| 2014/0067660 | A1* | 3/2014 | Cornish | B60L 53/35 705/39 |
| 2017/0136902 | A1* | 5/2017 | Ricci | B60L 53/36 |
| 2020/0369167 | A1* | 11/2020 | Krucinski | H02J 7/0042 |
| 2021/0053451 | A1* | 2/2021 | Bailey | B60L 53/16 |
| 2021/0104905 | A1* | 4/2021 | Chen | H02J 7/00714 |
| 2022/0126825 | A1* | 4/2022 | March | B60W 30/146 |
| 2022/0212555 | A1* | 7/2022 | Zhang | H02J 7/0063 |
| 2022/0379758 | A1* | 12/2022 | Hetrich | G06V 20/59 |

* cited by examiner

*Primary Examiner* — Nha T Nguyen
(74) *Attorney, Agent, or Firm* — Greenberg Traurig, LLP

(57) ABSTRACT

A system includes an automatic charging device. The automatic charging device includes a movable arm configured to connect a charging plug head in electric communication with a vehicle inlet of an electric vehicle. The system includes a current detector configured to be in electrical communication with the automatic charging device.

18 Claims, 4 Drawing Sheets

150

```
┌─────────────────────────────────────┐
│ CONNECT A CHARGING PLUG HEAD TO A   │
│    VEHICLE INLET OF AN ELECTRIC     │
│              VEHICLE                │
│                152                  │
└─────────────────────────────────────┘
                  │
                  ▼
┌─────────────────────────────────────┐
│  MONITOR CHARGING OF THE ELECTRIC   │
│              VEHICLE                │
│                154                  │
└─────────────────────────────────────┘
                  │
                  ▼
┌─────────────────────────────────────┐
│  IN RESPONSE TO DETERMINING THAT    │
│   THE CHARGING IS COMPLETE,         │
│  DISCONNECT THE CHARGING PLUG       │
│     HEAD FROM THE VEHICLE INLET     │
│                156                  │
└─────────────────────────────────────┘
```

FIG. 4

CHARGE DETECTION FOR AUTOMATIC CHARGING SYSTEMS

FIELD

This disclosure relates generally to electric vehicles. More particularly, this disclosure relates to charge detection for charging systems for electric vehicles, such as, but not limited to, automatic charging devices.

BACKGROUND

Automatic charging devices for vehicles can be utilized to connect an electric vehicle charging system to an electric vehicle without an operator having to manually plug into the electric vehicle. It is important that the automatic charging device remove the plug from the vehicle once the charging is complete. However, to do so generally requires communication between the electric vehicle charging system, the automatic charging device, and the electric vehicle. Such communication can require specific communication protocols.

SUMMARY

This disclosure relates generally to electric vehicles. More particularly, this disclosure relates to charge detection for charging systems for electric vehicles, such as, but not limited to, automatic charging devices.

In an embodiment, a system includes an automatic charging device. In an embodiment, the automatic charging device includes a movable arm configured to connect a charging plug head in electric communication with a vehicle inlet of an electric vehicle. In an embodiment, the system includes a current detector configured to be in electrical communication with the automatic charging device.

In an embodiment, the system includes electric vehicle supply equipment configured to provide power to the electric vehicle when connected in electrical communication with the electric vehicle.

In an embodiment, the electric vehicle supply equipment includes a charging cable including the charging plug head configured to be connected to the vehicle inlet of the electric vehicle.

In an embodiment, the charging plug head is configured to be secured to the movable arm of the automatic charging device.

In an embodiment, the current detector is a Hall effect sensor.

In an embodiment, the current detector is configured to output current measurements to the automatic charging device.

In an embodiment, the current detector is not in contact with the charging cable.

In an embodiment, in response to the current detector detecting that a charging state transitions from charging to not charging, the automatic charging device is configured to disconnect the charging plug head from the vehicle inlet.

In an embodiment, a system includes an automatic charging device. In an embodiment, the automatic charging device includes a movable arm configured to connect a first charging plug head in electric communication with a vehicle inlet of an electric vehicle. In an embodiment, the system includes a current detector configured to receive a second charging plug head from an electric vehicle supply equipment and configured to be in electrical communication with the automatic charging device.

In an embodiment, the system includes electric vehicle supply equipment configured to provide power to the current detector via the second charging plug head and power to the electric vehicle via the first charging plug head when the first charging plug head is connected in electrical communication with the electric vehicle.

In an embodiment, the first charging plug head is configured to be secured to the movable arm of the automatic charging device.

In an embodiment, the current detector is a Hall effect sensor.

In an embodiment, the current detector is configured to output current measurements to the automatic charging device.

In an embodiment, in response to the current detector detecting that a charging state transitions from charging to not charging, the automatic charging device is configured to disconnect the first charging plug head from the vehicle inlet.

In an embodiment, a method includes detecting, via a current detector, an initiation of a charging sequence between an electric vehicle supply equipment and an electric vehicle. In an embodiment, the method includes monitoring, via the current detector, a charge state. In an embodiment, the method includes in response to determining that a current supplied by the charging sequence is below a threshold value, outputting an indication to an automatic charging device that a charging sequence is complete.

In an embodiment, the method includes unplugging a charging plug head from the electric vehicle by the automatic charging device.

In an embodiment, the current detector is not in contact with a charging cable of the electric vehicle supply equipment.

In an embodiment, the method includes plugging a charging plug head into the electric vehicle by the automatic charging device.

In an embodiment, the automatic charging device is not in electric communication with the electric vehicle supply equipment.

In an embodiment, the current detector is a Hall effect sensor.

BRIEF DESCRIPTION OF THE DRAWINGS

References are made to the accompanying drawings that form a part of this disclosure and that illustrate embodiments in which the systems and methods described in this Specification can be practiced.

FIG. 4 is a flowchart of a method for automatically charging an electric vehicle (e.g., the electric vehicle of FIGS. 1-2), according to an embodiment.

Like reference numbers represent the same or similar parts throughout.

DETAILED DESCRIPTION

Generally, for an automatic connection device to successfully connect and charge an electric vehicle without direct communication with the vehicle or the charging unit, some method to determine the state of the charger itself is utilized.

In practice, if an electric vehicle approaches with a suitably prepared charging inlet, and the connection system attaches the electric vehicle charging system connector to the electric vehicle, a status of the charging infrastructure itself is missing (e.g., when is charging occurring, when should the equipment be disconnected, etc.).

Embodiments of this disclosure relate to systems and methods for detecting a charging process of an electric vehicle through non-invasive current monitoring technology communicatively coupled with an automatic charging device. As a result, communication between the electric vehicle, an electric vehicle charging system, and the automatic charging device are not necessary. Advantageously, the automatic charging device is not specific to an electric vehicle or to a specific electric vehicle charging system.

Embodiments of this disclosure enable the automatic charging device to determine a state of the charging without communicating directly with the electric vehicle or with the electric vehicle charging system. For example, measurement of current in a charging cable allows for detection of charging state transitions and characteristics of charging power and duration. Significantly, transitions from a not charging state to a charging state, a duration of the charging process, an amount of power transferred to the electric vehicle, and the transition from the charging state to the not charging state. As a result, direct communication with the electric vehicle and the electric vehicle charging system are not needed for the automatic charging device to operate safely and robustly.

An "electric vehicle," as used herein, includes a vehicle that has one or more electric motors configured to receive power from one or more batteries. The electric vehicle can include a hybrid vehicle, having both an internal combustion engine and one or more electric motors as well as a vehicle having no internal combustion engine.

Figure 1:
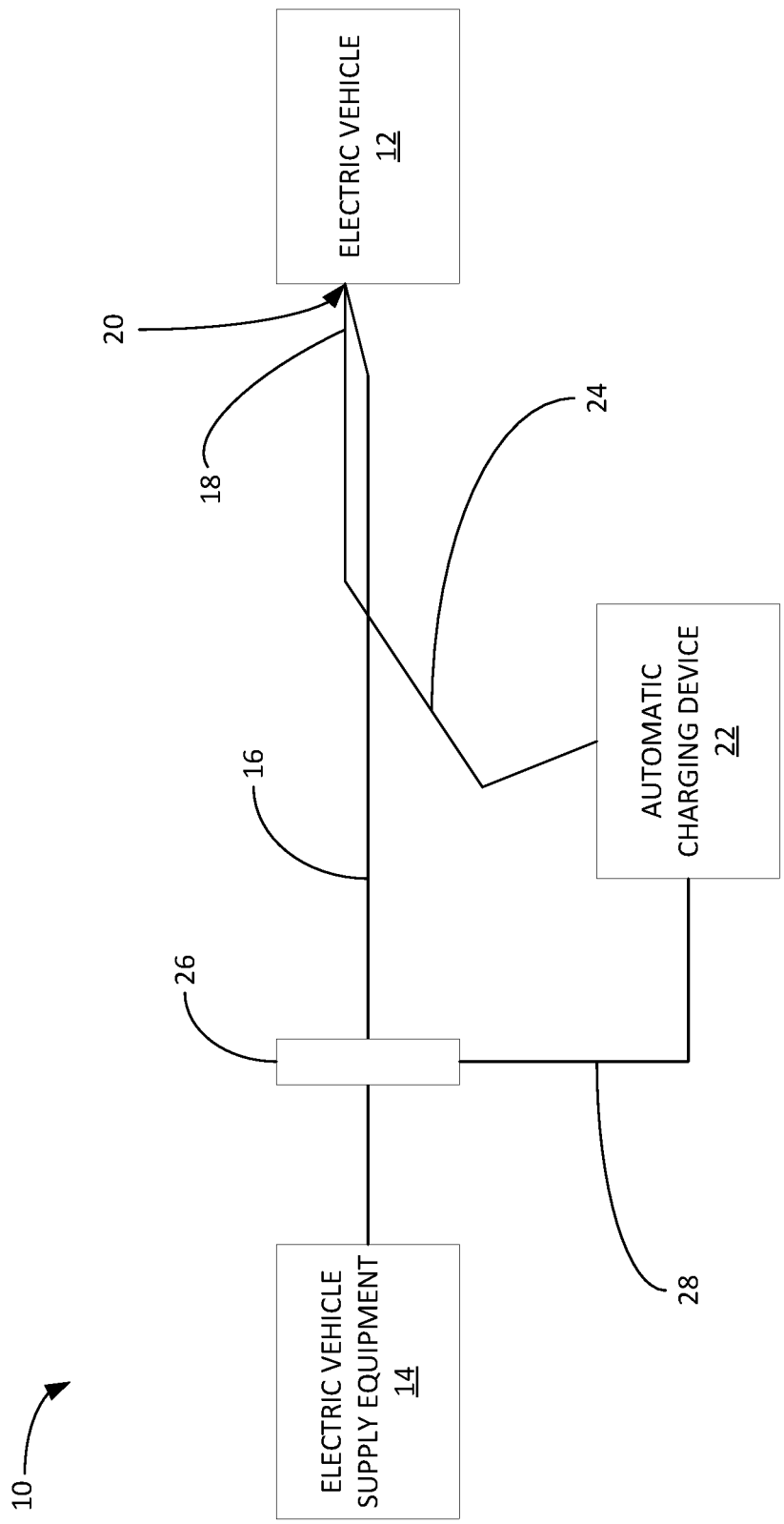
FIG. 1 is a schematic diagram of an electric vehicle charging system, according to an embodiment.

FIG. 1 is a schematic diagram of an electric vehicle charging system 10, according to an embodiment. The electric vehicle charging system 10 can be used to, for example, provide electrical power to an electric vehicle 12 to charge one or more batteries of the electric vehicle 12.

The electric vehicle charging system 10 includes electric vehicle supply equipment 14 configured to be electrically connected to the electric vehicle 12. The electric vehicle supply equipment 14 can be electrically connected to the electric vehicle 12 via a charging cable 16 which terminates in a charging plug head 18. The charging plug head 18 is configured to be mated with a vehicle inlet 20.

An automatic charging device 22 has a movable arm 24 that is secured to the charging plug head 18. The automatic charging device 22 and the movable arm 24 are configured to automatically connect the charging plug head 18 to the vehicle inlet 20 without a user manually plugging the charging plug head 18 into the vehicle inlet 20.

The automatic charging device 22 is configured to be in electrical communication with a current detector 26 via wiring 28. The current detector 26 can be, for example, a current detecting ring. The current detector 26 can be configured to surround the charging cable 16. The current detector 26 is not in contact with the charging cable 16. The current detector 26 can, for example, use induction and the Hall effect to make alternating current and direct current measurements. The measurements obtained from the current detector 26 can be provided to the automatic charging device 22 via wiring 28.

The current detector 26 is configured to provide the measurements to the automatic charging device 22 so that the automatic charging device 22 is aware of the charging state (e.g., charging in process, charging complete, charging duration) to monitor the charging process without direct communication with the electric vehicle 12 or the electric vehicle supply equipment 14. Thus, when the charging is complete, the automatic charging device 22 can disconnect the charging plug head 18 from the vehicle inlet 20. Advantageously, the automatic charging device 22 can be used in charging systems without communication protocols required between the electric vehicle 12 or the electric vehicle supply equipment 14. Additionally, the current detector 26 can be connected to an automatic charging device regardless of a particular type of equipment. That is, the current detector 26 can be agnostic to a type of equipment used in the electric vehicle charging system 10.

Figure 2:
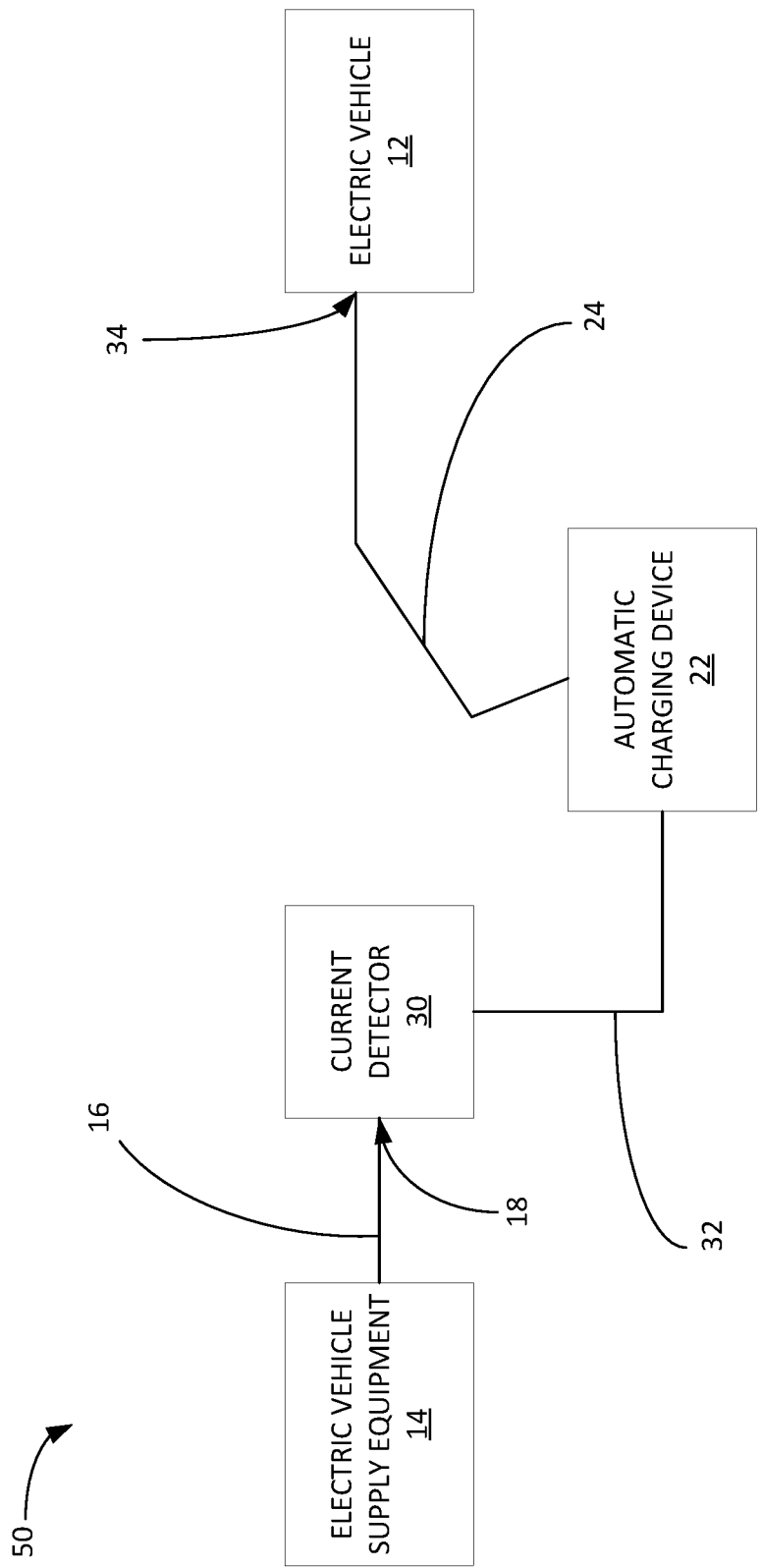
FIG. 2 is a schematic diagram of an electric vehicle charging system, according to an embodiment.

FIG. 2 is a schematic diagram of an electric vehicle charging system 50, according to an embodiment. The electric vehicle charging system 50 can be used to, for example, provide electrical power to the electric vehicle 12 to charge one or more batteries of the electric vehicle 12. The electric vehicle charging system 50 can include features that are the same as or similar to the features in the electric vehicle charging system 10 of FIG. 1. For simplicity of this Specification, features which have been previously described will not be described in additional detail unless specific reference is made.

The electric vehicle charging system 50 differs from the electric vehicle charging system 10 in the manner in which the current is monitored.

In the electric vehicle charging system 50, the electric vehicle supply equipment 14 is connected to a current detector 30 via the charging cable 16 and the charging plug head 18. Thus, the charging plug head 18 is plugged into the current detector 30. A cable 32 is electrically connected to the automatic charging device 22 and the current detector 30. The cable 32 is configured to provide both electrical power received from the electric vehicle supply equipment 14 and to provide measurements obtained by the current detector 30 to the automatic charging device 22. The movable arm 24 includes wiring and a charging plug head 34 configured to be connected to the vehicle inlet 20.

The current detector 30 is configured to measure current, charging state, power consumption, and charging duration. The current detector 30 is configured to provide the same information as the current detector 26 in FIG. 1.

Figure 3:
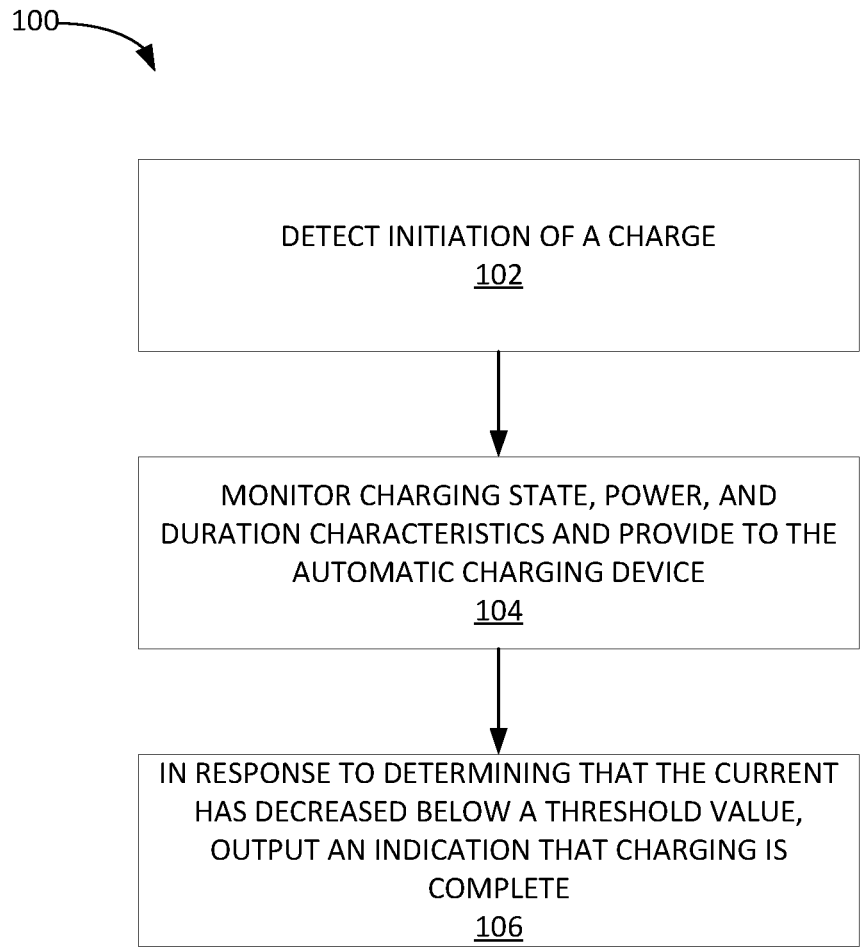
FIG. 3 is a flowchart of a method for automatically detecting charging, according to an embodiment.

FIG. 3 is a flowchart of a method 100 for automatically detecting charging, according to an embodiment. The method 100 can be performed using the electric vehicle charging system 10 of FIG. 1, according to an embodiment. The method 100 can also be performed using the electric vehicle charging system 50 of FIG. 2, according to an embodiment.

The method 100 begins at block 102. At block 102, a current detector (e.g., the current detector 26 or the current detector 30) detects initiation of a charge. The initiation of the charge can be detected based on, for example, detecting that current increases above a threshold value.

At block 104, the current detector then monitors the charge state, power, and duration characteristics and passes the information to the automatic charging device 22.

At block 106, in response to determining that the current has decreased below a threshold value, the automatic charging device 22 determines that a charging process has terminated. In response to determining that the current has decreased below a threshold value, the automatic charging device 22 may initiate an unplugging sequence to remove the charging plug head 18 from the vehicle inlet 20.

FIG. 4 is a flowchart of a method 150 for automatically charging an electric vehicle (e.g., the electric vehicle 12 of FIGS. 1-2), according to an embodiment.

At block 152, the method includes connecting a charging plug head (e.g., charging plug head 18 or charging plug head 34) to a vehicle inlet (e.g., the vehicle inlet 20).

At block 154, the method includes monitoring a charging process of the electric vehicle. The monitoring of the charging process can include performance of the method 100 (FIG. 3).

At block 156, in response to determining that charging has completed, the method includes disconnecting the charging plug head from the vehicle inlet.

Aspects:

Aspect 1. A system, comprising: an automatic charging device, wherein the automatic charging device includes a movable arm configured to connect a charging plug head in electric communication with a vehicle inlet of an electric vehicle; and a current detector configured to be in electrical communication with the automatic charging device.

Aspect 2. The system of aspect 1, further comprising electric vehicle supply equipment configured to provide power to the electric vehicle when connected in electrical communication with the electric vehicle.

Aspect 3. The system of aspect 2, wherein the electric vehicle supply equipment includes a charging cable including the charging plug head configured to be connected to the vehicle inlet of the electric vehicle.

Aspect 4. The system of aspect 3, wherein the charging plug head is configured to be secured to the movable arm of the automatic charging device.

Aspect 5. The system of any one of aspects 1-4, wherein the current detector is a Hall effect sensor.

Aspect 6. The system of any one of aspects 1-5, wherein the current detector is configured to output current measurements to the automatic charging device.

Aspect 7. The system of any one of aspects 1-6, wherein the current detector is not in contact with a charging cable.

Aspect 8. The system of any one of aspects 1-7, wherein in response to the current detector detecting that a charging state transitions from charging to not charging, the automatic charging device is configured to disconnect the charging plug head from the vehicle inlet.

Aspect 9. A system, comprising: an automatic charging device, wherein the automatic charging device includes a movable arm configured to connect a first charging plug head in electric communication with a vehicle inlet of an electric vehicle; and a current detector configured to receive a second charging plug head from an electric vehicle supply equipment and configured to be in electrical communication with the automatic charging device.

Aspect 10. The system of aspect 9, further comprising electric vehicle supply equipment configured to provide power to the current detector via the second charging plug head and power to the electric vehicle via the first charging plug head when the first charging plug head is connected in electrical communication with the electric vehicle.

Aspect 11. The system of aspect 9 or aspect 10, wherein the first charging plug head is configured to be secured to the movable arm of the automatic charging device.

Aspect 12. The system of any one of aspects 9-11, wherein the current detector is a Hall effect sensor.

Aspect 13. The system of any one of aspects 9-12, wherein the current detector is configured to output current measurements to the automatic charging device.

Aspect 14. The system of any one of aspects 9-13, wherein in response to the current detector detecting that a charging state transitions from charging to not charging, the automatic charging device is configured to disconnect the first charging plug head from the vehicle inlet.

Aspect 15. A method, comprising: detecting, via a current detector, an initiation of a charging sequence between an electric vehicle supply equipment and an electric vehicle; monitoring, via the current detector, a charge state; and in response to determining that a current supplied by the charging sequence is below a threshold value, outputting an indication to an automatic charging device that a charging sequence is complete.

Aspect 16. The method of aspect 15, wherein the method further comprises unplugging a charging plug head from the electric vehicle by the automatic charging device.

Aspect 17. The method of aspect 15 or aspect 16, wherein the current detector is not in contact with a charging cable of the electric vehicle supply equipment.

Aspect 18. The method of any one of aspects 15-17, wherein the method further comprises plugging a charging plug head into the electric vehicle by the automatic charging device.

Aspect 19. The method of any one of aspects 15-18, wherein the automatic charging device is not in electric communication with the electric vehicle supply equipment.

Aspect 20. The method of any one of aspects 15-19, wherein the current detector is a Hall effect sensor.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A system, comprising:
an automatic charging device,
wherein the automatic charging device includes a movable arm configured to connect a charging plug head in electric communication with a vehicle inlet of an electric vehicle; and
a current detector configured to measure an electric current in a charging cable, the current detector being in electrical communication with the automatic charging device,
wherein the current detector is not in contact with the charging cable,
wherein the current detector is configured to output current measurements to the automatic charging device.

2. The system of claim 1, further comprising electric vehicle supply equipment configured to provide power to the electric vehicle when connected in electrical communication with the electric vehicle.

3. The system of claim 2, wherein the electric vehicle supply equipment includes a charging cable including the charging plug head configured to be connected to the vehicle inlet of the electric vehicle.

4. The system of claim 3, wherein the charging plug head is configured to be secured to the movable arm of the automatic charging device.

5. The system of claim 1, wherein the current detector is a Hall effect sensor.

6. The system of claim 1, wherein the automatic charging device is configured to charge the electric vehicle based on the current measurements of the current detector and without direct communication between the electric vehicle and the automatic charging device.

7. The system of claim 1, wherein in response to the current detector detecting that a charging state transitions from charging to not charging, the automatic charging device is configured to disconnect the charging plug head from the vehicle inlet.

8. A system, comprising:
an automatic charging device,
wherein the automatic charging device includes a movable arm configured to connect a first charging plug head in electric communication with a vehicle inlet of an electric vehicle; and
a current detector configured to receive a second charging plug head from an electric vehicle supply equipment and configured to be in electrical communication with the automatic charging device,
wherein the current detector is also configured to measure an electric current in a charging cable of the automatic charging device, the current detector not being in contact with the charging cable,
wherein the current detector is configured to output current measurements to the automatic charging device.

9. The system of claim 8, further comprising electric vehicle supply equipment configured to provide power to the current detector via the second charging plug head and power to the electric vehicle via the first charging plug head when the first charging plug head is connected in electrical communication with the electric vehicle.

10. The system of claim 8, wherein the first charging plug head is configured to be secured to the movable arm of the automatic charging device.

11. The system of claim 8, wherein the current detector is a Hall effect sensor.

12. The system of claim 8, wherein the automatic charging device is configured to charge the electric vehicle based on the current measurements of the current detector and without direct communication between the electric vehicle and the automatic charging device.

13. The system of claim 8, wherein in response to the current detector detecting that a charging state transitions from charging to not charging, the automatic charging device is configured to disconnect the first charging plug head from the vehicle inlet.

14. A method, comprising:
plugging a charging plug head into an electric vehicle by an automatic charging device;
detecting, via a current detector, an electric current in a charging cable of the automatic charging device indicative of an initiation of a charging sequence between an electric vehicle supply equipment and the electric vehicle;
monitoring, via the current detector, a charge state based on current measurements; and
in response to determining that a current supplied by the charging sequence is below a threshold value, outputting an indication to the automatic charging device that a charging sequence is complete;
wherein the current detector is not in contact with the charging cable.

15. The method of claim 14, wherein the method further comprises unplugging a charging plug head from the electric vehicle by the automatic charging device.

16. The method of claim 14,
wherein the automatic charging device is configured to charge the electric vehicle based on the current measurements of the current detector and without direct communication between the electric vehicle and the automatic charging device.

17. The method of claim 14, wherein the automatic charging device is not in electric communication with the electric vehicle supply equipment.

18. The method of claim 14, wherein the current detector is a Hall effect sensor.

* * * * *